United States Patent
Harbo et al.

(10) Patent No.: US 11,280,092 B2
(45) Date of Patent: *Mar. 22, 2022

(54) METHOD OF PROVIDING A COVERING ELEMENT AND A COVERING ELEMENT FOR COVERING A HINGE PART OF A ROOF WINDOW

(71) Applicant: VKR Holding A/S, Hørsholm (DK)

(72) Inventors: Bjarne Harbo, Esbjerg (DK); Lucas Willemoes Hesselhof, Åbyhøj (DK)

(73) Assignee: VKR Holding A/S

( * ) Notice: Subject to any disclaimer, the term of this patent is extended or adjusted under 35 U.S.C. 154(b) by 199 days.

This patent is subject to a terminal disclaimer.

(21) Appl. No.: 16/346,059

(22) PCT Filed: Oct. 30, 2017

(86) PCT No.: PCT/DK2017/050356
§ 371 (c)(1),
(2) Date: Apr. 29, 2019

(87) PCT Pub. No.: WO2018/077367
PCT Pub. Date: May 3, 2018

(65) Prior Publication Data
US 2019/0284809 A1    Sep. 19, 2019

(30) Foreign Application Priority Data

Oct. 31, 2016    (DK) .............................. PA201670858

(51) Int. Cl.
*E04D 13/035*    (2006.01)
*B32B 37/04*    (2006.01)
(Continued)

(52) U.S. Cl.
CPC .......... *E04D 13/0354* (2013.01); *B32B 37/04* (2013.01); *B32B 37/1292* (2013.01);
(Continued)

(58) Field of Classification Search
CPC .... B32B 2037/1215; B32B 2037/1253; B32B 2310/0831; B32B 2311/24;
(Continued)

(56) References Cited

U.S. PATENT DOCUMENTS

2009/0155736 A1    6/2009    Vekoerrer
2014/0071595 A1*   3/2014    De Jong .................. B32B 7/12
                                                        361/679.01
(Continued)

FOREIGN PATENT DOCUMENTS

CN    101252893    8/2008
CN    105689912    6/2016
(Continued)

OTHER PUBLICATIONS

PCT/DK2017/050356 International Search Report, dated Jan. 1, 2018, 2 pages.
(Continued)

*Primary Examiner* — Michael A Tolin
*Assistant Examiner* — Brian R Slawski
(74) *Attorney, Agent, or Firm* — Merek, Blackmon & Voorhees, LLC

(57) ABSTRACT

A method of providing a covering element with a connection element for covering a hinge part of a roof window comprising the steps of engraving an interior surface of the covering element to provide an engraved surface with at least one cavity by subjecting the covering element to a laser beam at a polar angle, $\alpha 1$, and attaching the connection element to the covering element by introducing an anchor portion of the connection element into the least one cavity.

20 Claims, 8 Drawing Sheets

(51) Int. Cl.
*B32B 37/12* (2006.01)
*B32B 38/10* (2006.01)
*B32B 37/18* (2006.01)
*B29C 65/48* (2006.01)
*B29C 65/00* (2006.01)
*B29C 65/16* (2006.01)
*B29C 45/00* (2006.01)
*B29C 65/72* (2006.01)

(52) U.S. Cl.
CPC ............ *B32B 38/10* (2013.01); *E04D 13/035* (2013.01); *B29C 65/16* (2013.01); *B29C 65/4815* (2013.01); *B29C 65/4845* (2013.01); *B29C 65/72* (2013.01); *B29C 66/0246* (2013.01); *B29C 66/30325* (2013.01); *B29C 66/474* (2013.01); *B29C 66/712* (2013.01); *B29C 2045/0093* (2013.01); *B32B 37/182* (2013.01); *B32B 2037/1215* (2013.01); *B32B 2037/1253* (2013.01); *B32B 2310/0831* (2013.01); *B32B 2311/24* (2013.01); *B32B 2398/20* (2013.01)

(58) Field of Classification Search
CPC . B32B 2398/20; B32B 37/04; B32B 37/1292; B32B 37/182; B32B 37/06; B32B 38/10; B32B 38/0008; E04D 13/035; E04D 13/0354; B29C 65/00; B29C 65/16; B29C 65/48; B29C 65/4845; B29C 65/56; B29C 65/72; B29C 65/4815; B29C 65/02; B29C 66/02; B29C 66/02242; B29C 66/0246; B29C 66/028; B29C 66/30325; B29C 66/346; B29C 66/41; B29C 66/45; B29C 66/474; B29C 66/712; B29C 45/00; B29C 2045/0093
USPC ............ 156/60, 66, 242, 245, 272.2, 272.8, 156/275.5, 275.7, 297, 299, 308.2, 309.6, 156/327, 330, 332; 216/33, 34, 35, 39
See application file for complete search history.

(56) References Cited

U.S. PATENT DOCUMENTS

| | | | |
|---|---|---|---|
| 2014/0366452 A1* | 12/2014 | Viig | E04D 13/0354 49/400 |
| 2015/0247071 A1 | 9/2015 | Caillie et al. | |
| 2016/0052202 A1 | 2/2016 | Nishikawa | |
| 2016/0167353 A1 | 6/2016 | Fan et al. | |
| 2019/0001441 A1* | 1/2019 | Gu | B29C 66/919 |

FOREIGN PATENT DOCUMENTS

| | | | | |
|---|---|---|---|---|
| DE | 2443098 | | 3/1975 | |
| DE | 10105893 A1 * | | 8/2002 | ............ B29C 66/472 |
| DE | 202014005241 | | 8/2014 | |
| DE | 10 2013 211905 | | 12/2014 | |
| EP | 1355016 | | 10/2003 | |
| EP | 1681399 | | 7/2006 | |
| EP | 2055860 | | 5/2009 | |
| WO | WO 99/59793 A1 | | 11/1999 | |
| WO | WO 2005/008013 A1 | | 1/2005 | |
| WO | WO2013/050045 | | 4/2013 | |
| WO | WO2013/050043 | | 11/2013 | |
| WO | WO-2016143520 A1 * | | 9/2016 | ............ B23K 26/064 |

OTHER PUBLICATIONS

PCT/DK2017/050355 International Preliminary Report on Patentability, dated Oct. 19, 2018, 7 pages.
PCT/DK2017/050355 International Search Report, dated Jan. 1, 2018, 2 pages.
U.S. Appl. No. 16/346,044, filed Apr. 29, 2019.
Office Action dated Jul. 30, 2020 issued in connection with Chinese Application No. 201780066790.5 and English language translation thereof, 16 pages.
European Search Report dated Aug. 26, 2020 issued in connection with European Patent Application No. EP20181428, 2 pages.
"Joining of Metal-Plastics-Hybrid Structures Using Laser Radiation by Considering the Surface Structure of the Metal," Journal of Polymers, vol. 2016, Jul. 19, 2016, 11 pages.
Non-Final Rejection dated Nov. 5, 2021 issued in U.S. Appl. No. 16/346,044.

* cited by examiner

METHOD OF PROVIDING A COVERING ELEMENT AND A COVERING ELEMENT FOR COVERING A HINGE PART OF A ROOF WINDOW

FIELD OF THE INVENTION

The present invention relates to a method of providing a covering element with a connection element for covering a hinge part of a roof window. The invention further relates to a covering element for covering a hinge part of a roof window.

BACKGROUND ART

Roof windows may be provided in a number of varieties and include more or less complicated structures in order to allow opening of the sash and to fulfil other functions, such as ventilation, while permitting cleaning of the outside of the pane from inside the building. The varieties include roof windows of the pivoting type, wherein the hinge axis is either located at the centre or displaced from the centre of the window, and top-hung roof windows that can be pivoted for cleaning by means of an intermediate frame.

This is made possible by the provision of a hinge with a particular pattern of movements, which in turn makes it possible to establish an overlap between the covering element fastened to the frame and the counterpart covering element fastened to the sash in the closed position of the roof window. In such a hinge, the covering elements thus generally comprise at least two parts, one for covering the sash hinge part and one covering the frame hinge part.

The covering elements are designed to protect the window, the hinge and interior parts of the window from amongst other things weather, dirt, and grime, as these may cause the hinge to rust and, in worst case, cause the window to leak rain water and thereby possibly cause damage. The two covering elements are designed to allow an angular motion relative to each other, while opening and closing the window. In prior art of roof windows, the covering elements are most often attached by providing a separate connection element to connect the covering element to the corresponding parts of the hinge, or the frame or sash itself.

The separate connection element is often fixated to the covering element by mechanical fasteners. The use of mechanical fasteners for attaching a connection element and a covering element is advantageous, because such attachments are able to withstand relatively large forces such as pulling, pushing, and tugging from a user, but also environmental induced stress such as changing weather conditions and wind causing vibrations in the roof window installation.

A drawback of using mechanical fasteners is that the fasteners are often visible, thereby reducing the overall aesthetic perception of the user of the window.

Additionally, fasteners often deform the covering element when they penetrate the covering element. Hence, mechanical properties and the structure of the covering element may be compromised. Furthermore, the fasteners may induce an additional way for water to enter the the window which can cause problems with rust and corrosion.

Furthermore, the mechanical fasteners may in the worst case allow outside tampering with simple tools, thereby allowing burglars to create access to the building through the roof window by simply removing the accessible fastener and subsequently the covering element.

An alternative to attaching a covering element to a connection element by means of mechanical fastening elements is to use adhesives to connect the two elements. This solution however is not well suited for attaching the covering element to the connection element as the attachment provided by an adhesive layer does not have the peel and impact strength to endure the continuous stress induced by changeable weather condition and vibration caused by wind gusts. For example, during summer time a covering element on the exterior side of a roof window may easily reach 100 degrees Celsius which may cause adhesives to fail.

Furthermore, covering elements are often manufactured in a thin metal sheet. In a mounted condition the thin metal sheet may deform under stress induced by weather such as wind gusts, thereby causing an increase in peel stress in the adhesive bond, which is likely to result in a breakage of the adhesive bond between a covering element and a connection element.

Thus, it remains a challenge to attach a covering element to a connection element in a manner that do not suffer from the above-mentioned drawbacks, while at the same time being cost efficient to produce and install, and is less susceptible towards corrosion and rust formation. Additionally, for covering elements visible by the user, it is a further object to provide a covering element that is aesthetically pleasing to an observer looking at the roof window in a mounted condition.

SUMMARY OF THE INVENTION

In a first aspect of the invention this is solved by a method of providing a covering element with a connection element for covering a hinge part of a roof window comprising the steps of:

a) engraving an interior surface of the covering element to provide an engraved surface with at least one cavity by subjecting the covering element to a laser beam at a polar angle, $\alpha 1$ and b) attaching the connection element to the covering element by introducing an anchor portion of the connection element into the least one cavity.

Each cavity of the at least one cavity is engraved into the interior surface of the covering element by applying a laser beam on the interior surface, whereby material is removed to form a cavity. The cavity may be provided as a groove by moving the laser beam across an interior surface on covering element.

Throughout this description, spherical coordinates are used when describing the direction from which the incident laser beam engraving a cavity hits the surface, which in turn also describes the direction which the engraved cavity extends into the engraved surface. The origin for the spherical coordinates being the point on the surface where the laser beam is directed.

The polar angle is therefore defined as the angle between the laser beam and the normal vector of the surface of the covering element that is to be engraved at the point on the surface where the laser beam is directed. The polar angle therefore defines the direction in which a cavity extends into the surface in relation to the normal vector, i.e. the angle between the central axis of the cavity and the normal vector of the surface.

An azimuth angle may also be defined for the one or more cavities, as the angle between the incoming laser beam projected onto the surface and a common reference direction in the surface plane. The azimuth angle therefore describes the direction which a cavity extends when viewed from above.

With a method of this kind, the anchor portion of the connection element is able to fill the at least one cavity to provide a strong attachment between the covering element and the connection element. Meanwhile, this attachment method does not require that a screw or similar visible attachment element is inserted into the covering element and the exterior surface may therefore appear aesthetically pleasing finish to an observer looking at an installed roof window.

The anchor portion is introduced into cavities, while the anchor portion is in a fluid state, after which it can solidify to shape itself according to the cavities so that the cavities can retain the anchor portion and thereby the connection element.

The strong attachment between the covering element and the connection element is due to the cavities of the engraved surface of the covering element providing a larger attachment surface than a plane surface and each cavity providing a separate interlocking joint between the covering element and the covering element together with the anchoring portion. Hence, if some of the locking joints are destroyed there still multiple locking joints to maintain the covering element and the connection element connected.

Furthermore, by directing the laser so that the covering element is subjected to a laser beam angled in relation to the normal vector of the engraved surface i.e. the polar angle is different from zero degrees, the attachment of the covering element and a connection element have been remarkably improved.

In a presently preferred embodiment, the at least one cavity is engraved at a polar angle, $\alpha_1$, different from 0 degrees, preferably between and 80 degrees, more preferably between 15 and 70 degrees, most preferably between 20 and 60 degrees.

By engraving the at least one cavity at an angle with respect to the normal vector of the interior surface, the attachment of the covering element to the connection element can be strengthened even further. This is because the cavity may fail in retaining the anchor portion if subjected to forces parallel with the central axis of the cavity. An angled cavity will therefore retain the anchor portion better than a cavity engraved orthogonally into the interior surface, when the covering element is subjected to a force in a direction orthogonally away from the interior surface.

Generally, the at least one cavity may be engraved by subjecting the interior surface of the covering element to a laser beam from any direction above the interior surface at a polar angle different from 0 degrees.

In an embodiment of the invention, step a) further comprises engraving the engraved surface with at least one further cavity by subjecting the covering element to a laser beam from a different direction than that used to engrave the at least one cavity, such that the at least one cavity and the at least one further cavity does not extend into the engraved surface in parallel directions.

The at least one further cavity is engraved by a laser beam hitting the engraved surface at a different polar and/or azimuth angle, whereby the at least one further cavity extends into the engraved surface in a direction that is not parallel with direction of the at least one cavity.

In an embodiment, the at least one further cavity is engraved by a laser beam at an azimuth angle of 80 to 100 or 170 to 190 degrees different from the laser beam engraving the at least one cavity, preferably with the same polar angle as the at least one cavity. This will provide at least one further cavity which, when viewed from above, extends perpendicular or anti-parallel to the at least one cavity.

It should be noted, that the at least one cavity and at least one further cavity may be provided as grooves extending across the engraved surface. In this case, the cavities may intersect to form a continuous pattern which, even though it forms one connected cavity, may still be regarded as several different cavities.

By providing the as least one further cavity at an azimuth angle of 80 to 100 or 170 to 190 degrees in relation to the at least one cavity, the orientation of cavities will function as a barb giving a superior attachment between the covering element and the connection element. This is, as described above, due to the cavities being weakest at retaining the anchor portion, when a force is applied in a direction parallel with the cavity. By providing cavities extending in different directions when viewed from above, it will never be possible to apply a force on the covering element, which is parallel with all of the cavities.

In an embodiment, the method comprises an additional step of pressing the covering element and the connection element against each other during and/or subsequently after step b).

The additional step of pressing the covering element and the connection element together may further improve the attachment further as it ensures that the anchor portion is fully received in the at least one cavity i.e. achieve the maximum of interlocking joint pr. area.

The term "during" in the context of the present application should be understood as an action is performed throughout the whole step of interest or only in a part of the step of interest As an example "during" in the context of the additional step of pressing together the covering element and the connection element, the pressing may be done throughout whole step b or only in a part of step b.

The step of engraving an interior surface according to the invention can be performed by high precision and accuracy. In this way, it is possible to control the depth, length, direction and polar angle of the cavities. Furthermore, it also possible to engrave macroscopic patterns in the interior surface of the covering element to achieve the optimal interior surface to correspond with the anchor portion of the connection element.

In another embodiment of the invention the at least one cavity and/or at least one further cavity form a pattern in the surface of the covering element, the pattern is preferably chosen from a mesh, grid, circle or a spiral.

In an embodiment, the pattern may be provided by having multiple non-connecting cavities i.e. there is a distance S between a pair of neighboring cavities in the engraved surface of the covering element. The cavities are therefore provided in a predetermined manner that results in a desired pattern.

It should be noted that when a cavity is provided as a groove extending across the engraved surface, it may be engraved from different angles along the length of the groove, whereby the cavity may extend into the engraved surface in different directions, depending on position along the length of the groove. This is particularly relevant when the groove forms a spiral pattern or a pattern of concentric circles, in which case the groove will have a substantially rotationally symmetrical structure around the center of the pattern. The grove may preferably extend into the engraved surface at different directions when viewed from above, so that it may function as its own barb, i.e. a pull parallel with the direction which the cavity extends into the engraved surface at one point along the length of the groove, will be countered by other parts of the groove, as the pull will not be parallel with the cavity at these points.

Therefore, in an embodiment of the invention the at least one cavity is engraved as a groove extending a length across the engraved surface, and in a further embodiment, the polar and/or azimuth angle is changed along the length of the groove, so that the cavity extends into the engraved surface at varying angles.

Alternatively, in an embodiment, the pattern is provided to the engraved surface by one continuous cavity. In a further embodiment the pattern is obtained by a combination of continuous and non-connecting cavities.

A covering element according to the invention is adapted to cover the exterior portion of a roof window. The covering element must therefore be light to ease installation and logistic but must also withstand the stress from changing weather conditions. In an embodiment the covering element is made from any plastic or a metal, but in a presently preferred embodiment the covering element is made from aluminum or coated aluminum to comply with the material requirements of a covering element.

In an embodiment of the invention, the laser engraving is performed by at least two lasers, wherein the at least two lasers provide a laser beam from different polar and/or azimuth angles on the engraved surface of the covering element.

By using at least two lasers, the lasers may be mounted in fixed positions at fixed angles so that the covering element may be moved in relation to the lasers, whereby a first laser may engrave the at least one cavity and a second laser may engrave the at least one further cavity. This in turn requires a less elaborate production setup, thereby reducing the manufacturing costs of the roof window. Furthermore, the engraving of the interior surface of the covering element may be completed quicker, thereby reducing manufacturing time.

According to the invention the anchor portion provides mechanical anchoring joints between the covering element and the connection element together with the laser engraved cavities.

The anchor portion may in an embodiment form part of the connection element before step b, i.e. the anchor portion may be integral with the connection element.

In another embodiment of the invention the anchor portion is provided as an individual layer between the covering element and the connection elements.

In an embodiment of the invention the anchor portion is a polymer, preferably a thermoplastic polymer, or an adhesive.

In a further embodiment, wherein the anchor portion is thermoplastic polymer, the anchor portion is integral with the connection element before step b.

In an embodiment of the invention, wherein the anchor portion is a thermoplastic polymer, and the step of introducing the anchor portion into the engraved surface in step b, is performed by melting the anchor portion of the connection element and allowing the melted anchor portion to settle into the cavities of the engraved surface.

In an embodiment of the invention, the melting of the anchor portion of the connection element is accomplished by laser, heat, or ultra-sound.

In an embodiment of the invention, the melting of the anchor portion is performed by heating the covering element, and during the heating or subsequently after the heating of the covering element pressing the connection element against the heated engraved surface of the covering element.

In a further embodiment both the covering element and the anchoring portion is heated before and/or during step b.

In an alternative embodiment, the connection element is molded directly on the engraved surface, whereby the anchor portion is introduced into and formed in the engraved surface.

The advantage of using a pre-fabricated connection element and melting the anchor portion during assembly is that the connection element may be manufactured in a separate production line or acquired from an outside distributor.

In an embodiment of the invention, the molding of the connection element to the covering element is performed by injection molding.

Some thermoplastics may become brittle or weakened if heated above the glass-transition temperature without being heated to the melting temperature. Although the anchor portion is heated above the melting temperature, a transition portion of the connection element, i.e. the portion in proximity with the anchor portion, may be weakened by the melting/heating process. By molding the connection element directly on the engraved surface of the covering element a uniform temperature profile is achieved throughout the material reducing the brittleness of connection element.

Furthermore, by injection molding the connection element directly on the engraved surface of the covering element, it is ensured that the anchor portion is fully introduced into the cavities.

In a presently preferred embodiment, the anchor portion is an adhesive provided in a layer between the engraved surface of the covering element and the connection element.

By introducing an adhesive layer into the cavities of the covering element the attachment will be a combination of mechanical anchoring and adhesives bonds between the covering element and the connection element. The result of having an attachment provided with mechanical anchoring and adhesive bonds improves the overall impact and peel strength of the attachment.

In a further embodiment the adhesive is selected from the group of polyurethane based adhesives, epoxy based adhesives, or acrylic based adhesives, and/or light curable adhesives, preferably UV curable adhesives.

By using light curable adhesives, the curing process may be controlled more accurately. The only requirement for applying light curable adhesives is that at least one of the covering element or connection element has to be transparent for light in the frequency used to cure the adhesive, preferably the connection element is the transparent element.

In an embodiment according to the invention, the surface of connection element facing the adhesive layer is subjected to step a. In this case, each variation of step a as described for the covering element in other embodiments of the invention may also be applied equally to the connection element.

Applying step a on the surface of the connection element is mostly advantageous, when the anchor portion is provided by an adhesive. In such scenarios, the adhesive may form a stronger connection with the connection element.

In one embodiment the depth of the at least one cavity is 100 to 1000 µm, preferably 200 to 800 µm, more preferably 300 to 700.

With an engraving depth in this magnitude, the method may be applied to thin pieces of metal thereby reducing the weight of the covering assembly including the covering elements.

In one embodiment the width of the at least one cavity is 10 to 100 µm, preferably 20 to 80 µm, more preferably 30 to 70 µm.

The cavities should be wide enough for the fluid anchor portion to be introduced during manufacturing, while also not being so wide that the cavity fails at retaining the anchor portion. In general, the wider the cavities are, the fewer the number of joints formed between the anchor portion and the engraved surface per area.

In a second aspect of the invention is provided covering element for covering a hinge part of a roof window, said covering element having an exterior side and an interior side and comprising a connection element, adapted for connecting the covering element to the hinge part, attached to the interior side, wherein an engraved surface of the interior side comprises at least one cavity extending into the engraved surface at a polar angle $\alpha 1$, and the connection element comprises an anchor portion which is retained in the at least one cavity.

By providing the covering element with an engraved surface, preferably by laser engraving, and retaining an anchor portion in said engraved surface, it is possible to eliminate the use of mechanical fasteners. Furthermore, production and material costs can be reduced by eliminating the need for mechanical fasteners.

More advantageously the cover element according to the invention will have a completely smooth surface, hence the covering element is provided with an aesthetically pleasing look for an observer looking at the covering element, in a mounted condition, and the covering element will be less susceptible to corrosion and outside tampering.

In an embodiment of the invention, $\alpha_1$ is different from 0 degrees, preferably between 10 and 80 degrees, more preferably between 15 and 70 degrees, most preferably between 20 and 60 degrees.

These angles have shown to be particularly effective at retaining the anchor portion. If the angles of the at least one cavity becomes too steep, i.e. near 0 degrees with the normal vector of the engraved surface, the cavity will be less efficient at retaining the anchor portion when a pull orthogonal to the surface is applied on the mounting. Meanwhile, a cavity engraved too shallow, i.e. near 90 degrees with the normal vector of the engraved surface, the structural integrity of the at least one cavity will be weakened as the side wall formed between the cavity and the surface will become too thin. Additionally, it will also become difficult to introduce the anchor portion into a shallow cavity during assembly, when the anchor portion is in a fluid state.

The anchor portion is introduced into the at least one cavity during assembly, while the anchor portion is in a fluid state, after which it can solidify to shape itself according to the cavity so that the cavity can retain the anchor portion and thereby the mounting bracket.

By engraving the at least one cavity at an angle with respect to the normal vector of the engraved surface, the attachment between the covering element and the connection element can be strengthened even further. This is because the at least one cavity may fail in retaining the anchor portion if subjected to forces parallel with the central axis of the cavity. An angled cavity will therefore retain the anchor portion better than a cavity engraved orthogonally into the engraved surface, when the covering element is subjected to a force in a direction orthogonally away from the engraved surface.

The anchor portion may be provided in various ways. According to an embodiment of the invention the anchor portion is an integral portion of the connection element. This may be accomplished by making the connection element from a thermoplastic which can be partially melted during manufacturing, such that the melted plastic can be introduced into the at least one cavity, where it can settle to form the anchor portion.

The advantage of this is that the connection element may be manufactured in a separate production line or acquired from an external supplier and then partially melted during assembly. A possible drawback for some thermo plastics is while the anchor portion is heated above the melting temperature and allowed to solidify; the parts of the connection element in proximity with the anchor portion may be heated above the glass-transition temperature, whereby the connection element may be weakened.

Alternatively, an integral anchor portion may be provided by molding the connection element directly on top of the engraved surface, preferably using injection molding, whereby the melted material can settle into the at least one cavity to form the anchor portion. This requires a slightly more elaborate production line, but has the advantage that the entire connection element is heated above the melting temperature, thereby ensuring a uniform strength of the material of the connection element. Furthermore, the injection molding ensures that the melted plastic is fully introduced into the at least one cavity, thereby providing a stronger attachment between the connection element and the covering element.

In another embodiment the anchor portion is provided by an adhesive. The adhesive is disposed on the engraved surface during assembly, whereby it is introduced into the at least one cavity, after which the connection element is arranged on the adhesive and the adhesive is cured to adhere to the connection element and form the anchor portion. This provides a strong attachment between the connection element and the covering element, which has low manufacturing and assembly costs.

In an embodiment of the invention the at least one cavity is engraved using a laser. By using a laser to engrave the engraved surface, the manufacturing costs may be reduced as the engraving can be automated and the engraving time reduced. Furthermore, once the initial cost of the laser has been paid, the laser will be able to run continuously without maintenance at low cost for prolonged periods of time.

In an embodiment of the invention, the engraved surface is engraved with several cavities, wherein at least some of the cavities are angled different from others such that they are not parallel. Preferably, the cavities extend in different directions when viewed from above the surface.

By providing cavities that extend in different directions, the cavities will function as a barb for each other, giving a superior attachment between the connection element and the covering element. This is, as described above, due to the cavities being weakest at retaining the anchor portion, when a force is applied in a direction parallel with the cavity. By providing two or more cavities extending in different directions, it will never be possible to apply a force on the covering element, which is parallel with all of the cavities.

In another embodiment of the invention, all cavities are parallel. This may be useful in a few applications, where it may be desirably to detach the connection element from the covering element. Generally, the attachment of the connection element is considered irreversible unless extreme measures are applied, e.g. heating to re-melt the anchor portion or forces large enough to break the joints formed by the anchor portion. However, if all cavities are parallel, the connection element may be detached by applying a large force, e.g. a blow of a hammer, substantially parallel to the cavities.

In an embodiment of the invention the at least one cavity is provided by a continuous groove extending in a spiral pattern. This provides the advantages above, while also allowing the engraving process to be done without shutting off the laser and repositioning the laser, which in turn reduce assembly time. It should be noted, that in embodiments, wherein the at least one cavity is provided as one cavity extending across the surface in a spiral or circular pattern, the cavity may be angled differently along it's extend.

In an embodiment of the invention, the at least one cavity is provided with rough side walls. In this context, rough may be defined by irregularities on the sidewall surface down to a few hundred nanometers.

By making the sidewalls of the at least one cavity rough, the surface area engaging the anchor portion will be increased. This may compliment the one or more cavity being provided with different angles, such that the attachment is strengthened further.

In some embodiments wherein the anchor portions are not integral with the connection element, the connection element has also been engraved with at least one cavity, and the adhesive providing the anchor portion is retained by the at least one cavity on both the covering element and the connection element. This allows the connection element to be made from materials, which are difficult for adhesives to adhere to.

In a third aspect of the invention a covering element for covering a roof window comprising an exterior surface, an interior surface adapted to, a connection element attached to the connection interior surface of the covering element is obtainable by a method comprising the steps of:

a) engraving the interior surface of the covering element to provide an engraved surface with at least one cavity, b) attaching the connection element to the covering element by introducing an anchor portion of the connection element into the least one cavity, wherein in step a) the at least one cavity is engraved in the interior surface of the covering element by subjecting the covering element to a laser beam at a first polar angle, $\alpha_1$.

Each specific embodiment and variation of features applies equally to each aspect of the invention unless specifically stated otherwise.

BRIEF DESCRIPTION OF DRAWINGS

The invention will be described in more detail below by means of non-limiting examples of embodiments and with reference to the schematic drawing, in which.

DETAILED DESCRIPTION OF THE INVENTION

Figure 1:
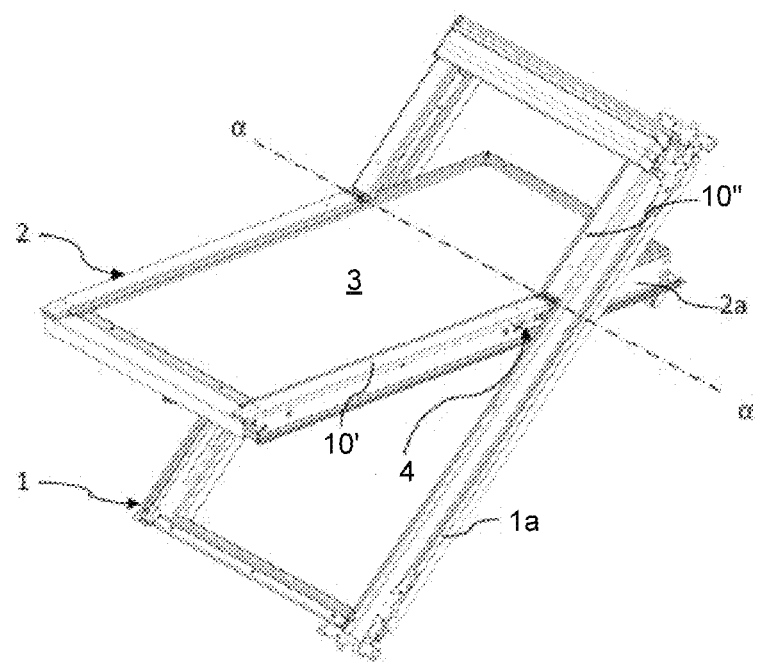
FIG. 1 is a perspective view of a prior art roof window.

In a manner known per se, the window comprises a sash 2 carrying a glazing in the form of a pane 3 and a frame 1. The window is intended to be built into a surface, which is inclined with respect to the horizontal, typically a roof, and the window will in the following be referred to as roof window. At a position between the top and centre of the window, there is a hinge connection between the frame 1 and the sash 2. The hinge connection in FIG. 1 comprises a set of two hinges, of which one hinge 4 is visible. The frame 1 and sash 2 is each formed by four members of which one frame side member 1a and one sash side member 2a are indicated.

The sash 2 is openable with respect to the frame 1, as the sash 2 may be moved from a closed position, in which e.g. the sash side member 2a is substantially parallel with the frame side member 1a, to an open position, in which the sash side member 2a forms an angle with the frame side member 1a. During this movement the sash 2 rotates about a hinge axis α situated at the hinge connection. As indicated in FIG. 1, the hinge axis α is located between a centre axis and the top of the roof window, preferably in the interval ⅓ to ⅔ of the distance between the centre axis and the top, most preferred substantially at ½ of the distance between the centre axis and the top. Other positions of the hinge axis are of course conceivable, for instance at the centre of the roof window.

To protect the interior and the components of the window itself and to ascertain weather-proof transition to the surrounding roofing, the roof window comprises a covering, including flashing members (not shown), cladding and covering elements of which a frame side covering element and sash side covering element are shown. The assembly of the roof window covering and the hinge part enables protection from the weather without limiting the degree of freedom in which the roof window may be opened.

Figure 2:
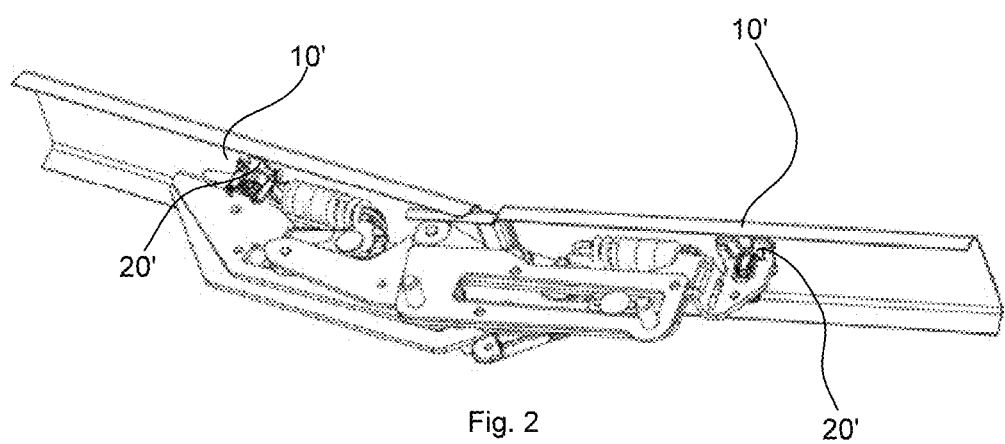
FIG. 2 is a perspective view of a hinge for a roof window connected to covering elements according to the invention.
Figure 3:
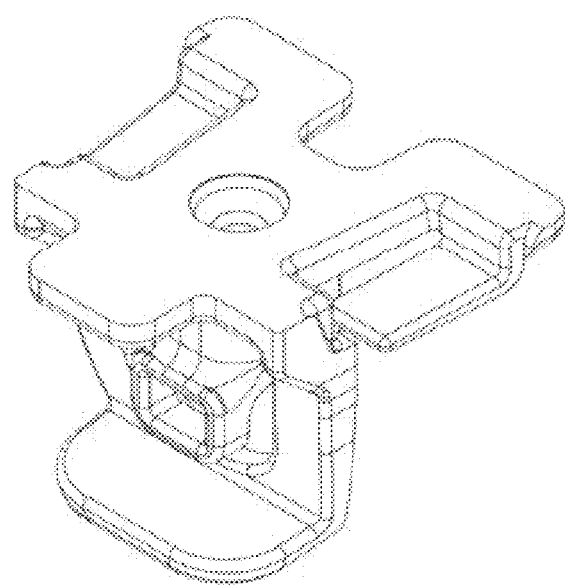
FIG. 3 is perspective view of a prior art connection element.
Figure 4:
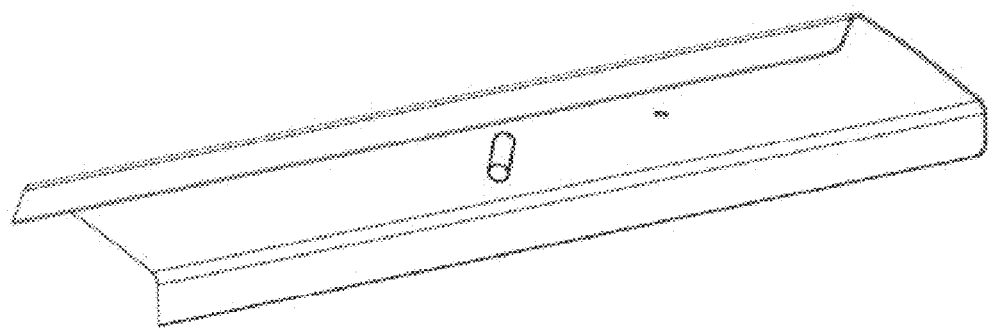
FIG. 4 is perspective view of disassembled prior covering element, connection element and a frame hinge part of a hinge.
Figure 4:
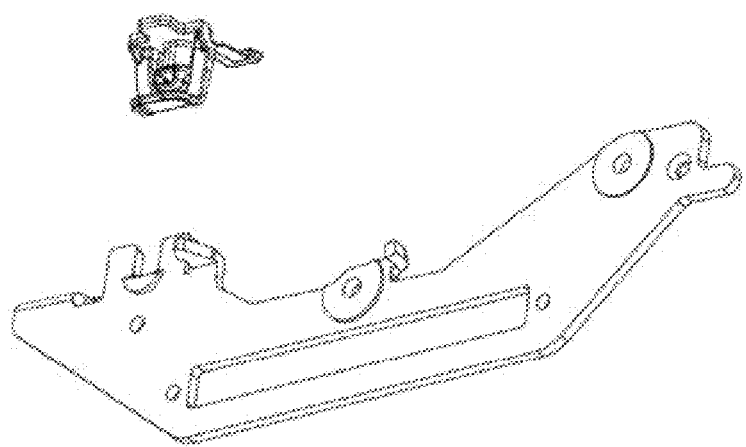

Referring now to FIGS. 2 to 4, detailed views of a typical covering assembly comprising two covering elements connected to the frame hinge part and sash hinge part of a hinge through a connection element are illustrated.

Referring now to FIG. 2 showing a hinge comprising a frame hinge part and a sash hinge part. Both hinge parts are provided with means for receiving a connection element.

In the particular embodiment shown in FIG. 3, the connection element is in the shape of a snap anchor that is configured to connect with a corresponding receiving section of a frame hinge part and sash hinge part of a hinge. In the case where the connection element is in the form of a snap anchor the receiving section of the hinge part may be a holding clip. In more detail, the snap anchor comprises a top surface configured to abut an interior side of the respective covering element, a guide portion and an engagement portion. The guide portion of the snap anchor comprises two opposing guide surfaces to interact with an opposing supporting surface of the holding clip. In this way, the connection between the snap anchor and the frame and sash hinge part of the roof window is obtained by introducing the snap anchor into a holding clip connected to the base plate of the frame hinge part and the sash hinge part of the hinge.

The connection element is generally pre-mounted onto a covering element and the covering element may subsequently, after successfully installing a roof window, be connected to the frame hinge part of the hinge by connection means such as snapping. The attachment between the covering element and the connection element, as can be seen in FIG. 4, is obtained by introducing a mechanical fastener such as a rivet that penetrates the exterior surface of the covering element and is introduced in the receiving section of a connection element.

The penetration of the mechanical faster through the covering element provides the exterior surface of the covering element with a less attractive appearance for an observer looking at the window from the exterior side of a building structure. Furthermore, the covering element is often a thin piece of coated aluminium, which may deform upon penetration of a mechanical fastener. Thus, the covering element may lose its original dimensions and structural capacity. The assembled covering element may then be fitted to the frame hinge part of the hinge.

Figure 5:
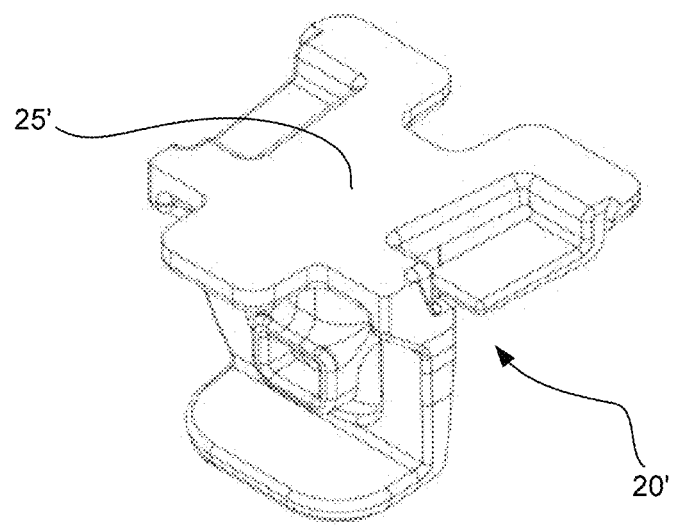
FIG. 5 is a perspective view of an embodiment of a connection element according to the invention.
Figure 6:
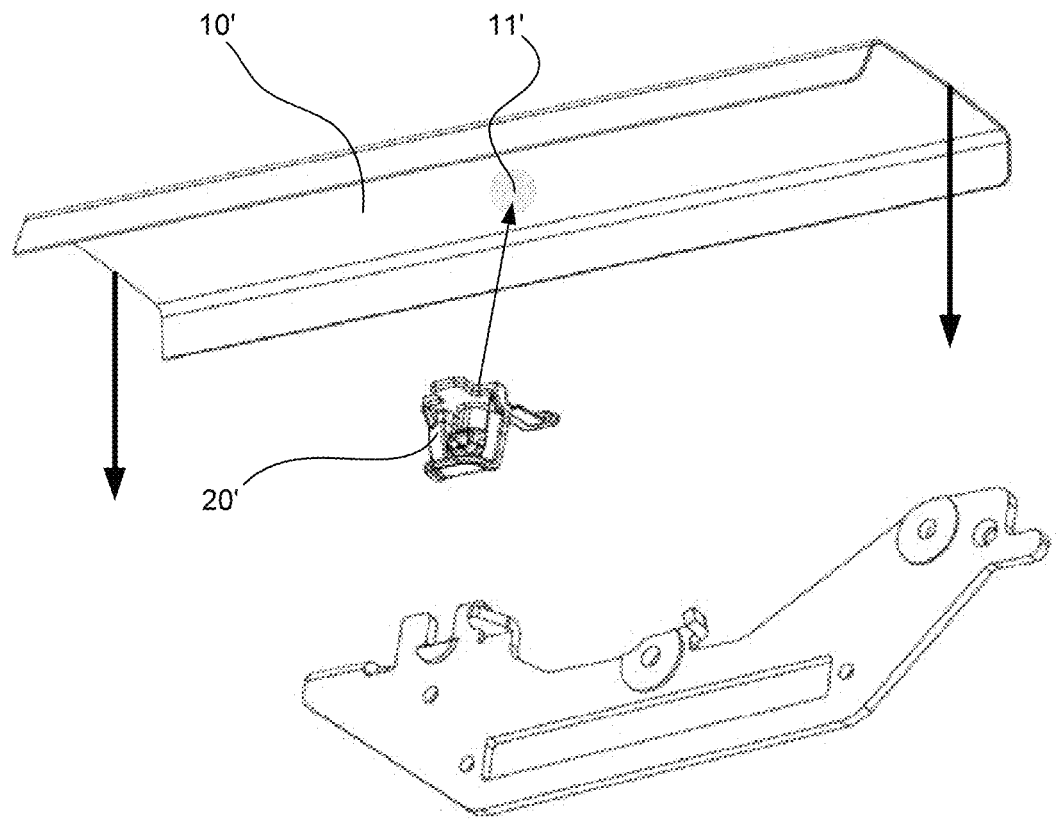
FIG. 6 is an embodiment of a disassembled covering element according to the invention.

Referring now to FIGS. 5 and 6, a first embodiment of a disassembled covering element according to the invention is shown.

The covering element 10' comprise an exterior surface adapted to face away from the roof window in an installed condition and an interior surface adapted to face a hinge of hinge of a roof window, a connection element 20' attached to the interior surface of the covering element 10', wherein in the connecting element 20' comprise at least one anchor portion 25' adapted to be introduced into and retained in at least one cavity 12 engraved into the engraved surface 11' of the covering element 10'. The engraved surface 11' comprises a plurality of cavities providing a plurality of interlocking joints between the covering element 10' and anchor portion 25' of the connection element 20'.

In the particular embodiments shown in FIGS. 5 and 6 the anchor portion 25' of the connection element 20' is made from a thermoplastic polymer that is integral with connection element 20' i.e. the whole connection element 20' is made from a thermoplastic polymer. In an embodiment of the invention, the connection element 20' is attached to the covering element 10' by heating up the covering element 10', and subsequently pressing the anchor portion 25' of the connection element 20' against the heated, engraved surface 11' of the interior side of the covering element 10', whereby the heat from the covering element 10' will melt the anchor portion 25'. As the anchor portion 25' melts the thermoplastic will flow into the cavities 12 in the engraved surface 11'. After the cavities 12 have been filled the heating is stopped and the thermoplastic is allowed to solidify creating mechanical interlocking joint between the covering element 10' and anchor portion 25' of the connection element 20'.

Figure 7A:
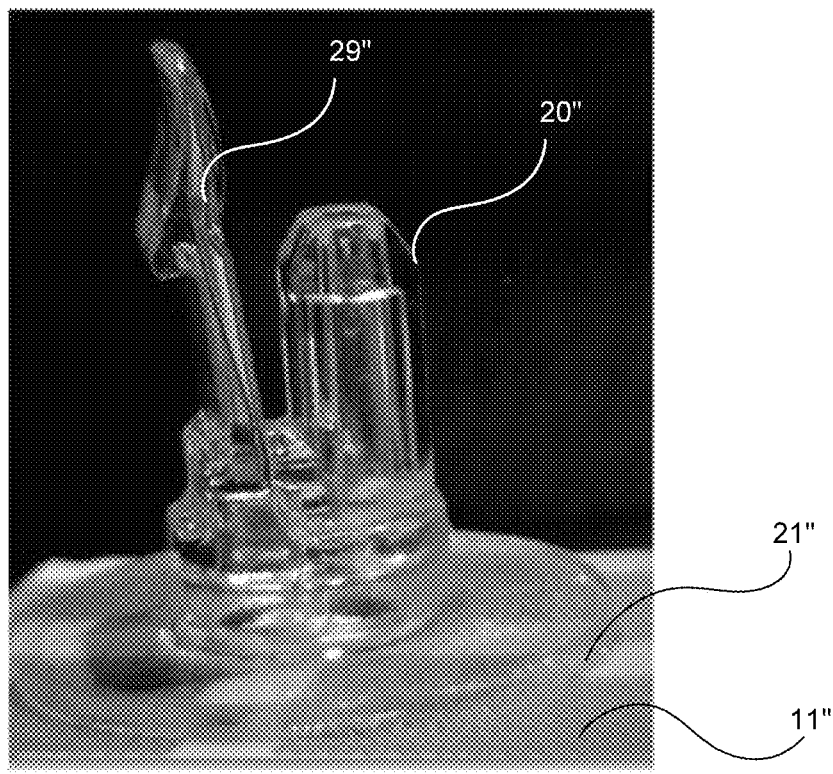
FIG. 7a shows a side view of another embodiment of the connection element attached to an engraved surface.
Figure 7B:
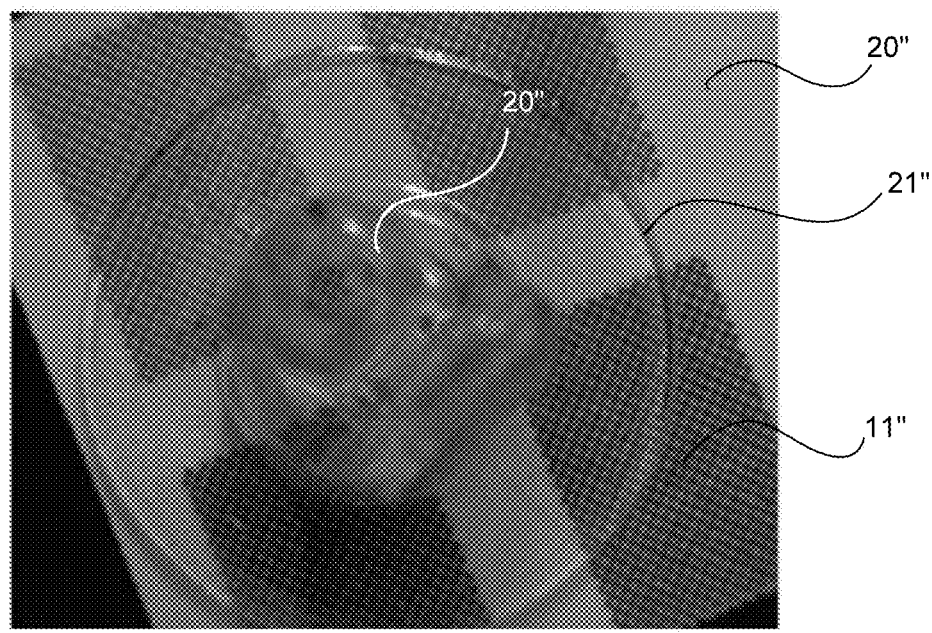
FIG. 7b shows a top view of another embodiment of the connection element attached to an engraved surface.

Turning now to FIGS. 7a and b, another embodiment of a connection element 20" is shown attached to an engraved surface 11". In the shown embodiment, the engraved surface 11" has been engraved with cavities in the form of a plurality of grooves extending across the engraved surface 11". Although it cannot be seen in FIGS. 7a and b, the grooves have been engraved at a polar angle different from 0 degrees, such that the cavities extend into the engraved surface 11" at an angle in relation to the normal vector of the engraved surface 11".

Furthermore, every second of the grooves have been engraved at and azimuth angle 90 degrees different from the other grooves. This has provided a pattern of intersecting grooves forming a mesh on the engraved surface 11". Because the cavities extend into the engraved surface 11" in different directions, the cavities cooperate in retaining the anchor portion 25", as a force applied on the attached covering element 10" and connection element 20" can never be parallel with all cavities.

The connection element 20" is provided a rim extending radially from the base of the connection element 20". The rim provides the connection element 20" with an enlarged connection area, such that the anchor portion 25" can be attached to as many cavities in the engraved surface 11" as needed for obtaining a sufficiently strong attachment between the covering element 10' and the connection element 20".

In the shown embodiment, the connection element 10" have been made from a transparent material which allows the anchor portion 25" to be provided by a UV-curable adhesive, because the adhesive can be illuminated and cured, even after the connection element 20″ have been pressed against the engraved surface 11″.

In general, the adhesive need not be UV-curable, this is chosen for enhanced control of the curing process. The important properties of the adhesive are mainly its strength and adhesion to the materials from which the connection element 20 and the covering element 10 are made. The adhesive should however also, when fluid, have a viscosity which allows it to enter the cavities 12, and, when cured, have a temperature tolerance of at least approx. −20 to 100° C., preferably −40 to 120° C. such that it can withstand both winter and summer conditions.

An example of an applicable adhesive is DELO-PHOTO-BOND® MF4055 which is a light-curable adhesive with the above mentioned properties. As mentioned before, the use of light-curable adhesives requires that at least one of the covering element 10 or the connection element 20 is transparent to light of the relevant wavelength, i.e. the material of one of the covering element 10 or the connection element 20 should have a sufficiently high transmission coefficient to allow the light to reach the adhesive.

In another embodiment, the rim is made from a thermoplastic, thus allowing it to act as the anchor portion 25″. In such embodiments, the anchor portion 25″ would be heated locally at assembly, such that only the anchor portion 25″ and not the remaining portion of the connection element 20″ exceed the melting temperature of the thermoplastic. The melted anchor portion 25″ can then be introduced into the cavities of the engraved surface 11″ where it is allowed to solidify and form mechanical locking joints.

The connection element 20″ of the shown embodiment is further provided with a snap lock 29″. The snap lock 29″ allows the connection element 20″ to releasably connect the covering element 10″ to a hinge part. Similar snap locks 29″ may also be incorporated into other embodiments of the invention.

Turning now to a description of preferred embodiments of the attachment between the covering element and the connection element.

Figure 8:
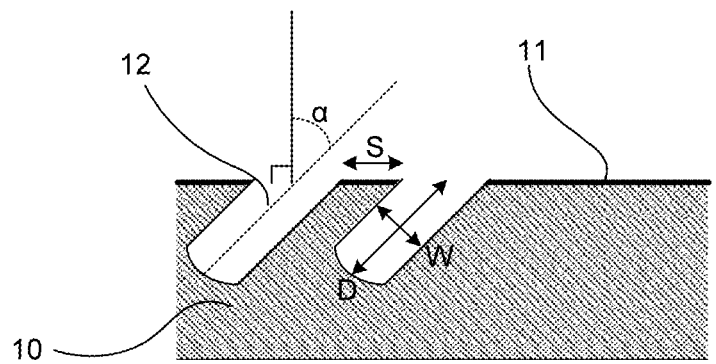
FIG. 8 shows a cross sectional view of a schematic drawing of an embodiment of the engraved surface of the covering element.

FIG. 8 illustrates a first cross sectional view of covering element 10. The engraved surface 11 of the covering element 10 have been subjected to a laser beam according to the present invention from a direction that is angled in relation the normal vector of the surface of the covering element, i.e. the polar angle of the direction is different from 0 degrees. The polar angle is denoted as the angle α and is preferable between 10 to 80 degrees, more preferably 30 to 70 degrees.

The laser engraving step provides the engraved surface of the covering element 10 with a first type of cavities 12. The first type of cavities 12 extend a length (L) from the engraved surface 11 of the covering element 10 into the covering element 10 in a direction that is preferably not parallel with the normal vector of the engraved surface 11.

The covering element will in most cases be engraved with cavities having a length (L) in the range of 100 to 1000 μm, preferably in the range of 200 to 800 more preferably in the range of 200 and 400 μm to provide an attachment having the required strength.

The distance S is the distance between two neighboring cavities. It is contemplated that the distance S between two neighboring cavities may be independently for each pair of neighboring cavities.

Figure 9:
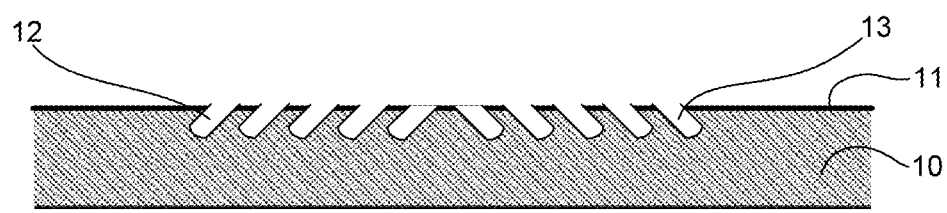
FIG. 9 shows a cross sectional view of a schematic drawing of an embodiment of the engraved surface of the covering element illustrating a first type of cavities and a second type of cavities arranged symmetrically around a center axis.
Figure 10:
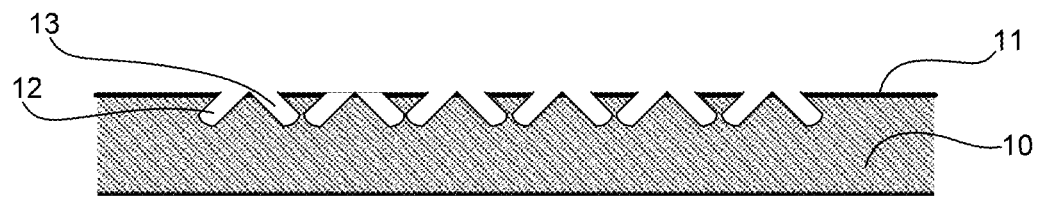
FIG. 10 shows a cross sectional view of a schematic drawing of an embodiment of the engraved surface of the covering element, wherein the first type of cavities and second type of cavities are arranged alternately in pairs.
Figure 11:
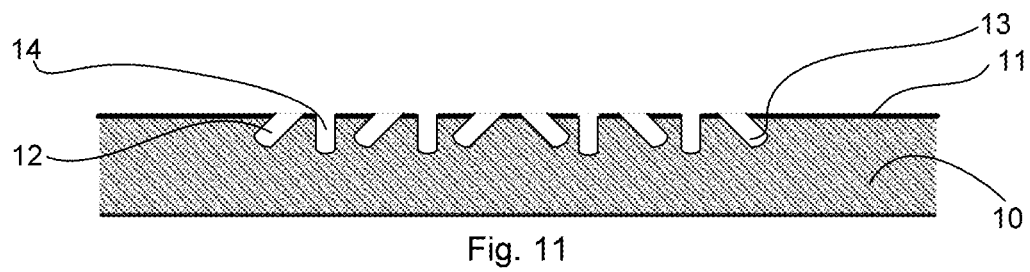
FIG. 11 shows a cross sectional view of a schematic drawing of an embodiment of the engraved surface of the covering element illustrating a third type of cavities.

Referring now to FIG. 9 to FIG. 11, three embodiments of the engraved surface 11 having different arrangement of the cavities 12, 13, 14 are illustrated.

In FIGS. 9 and 10 the engraved surface 11 comprises a plurality of first type cavities 12 and second type cavities 13. The first type cavities 12 extends to the "left", and the second type cavities 13 extend to the "right". However, it is contemplated that "right" or "left" is a simplification when the first and second type cavities 12, 13 are seen in a two-dimensional drawing, and the direction of the first and second type cavities 12, 13 may extend into the plane or out of the plane.

By having the first and second type cavities 12, 13 that does not extend in a parallel direction into the engraved surface 11, the attachment achieved between the covering element 10 and the connection element 20 has an improved peel and/or impact strength.

The first, second and or third type of cavities 12, 13, 14 may be arranged with a high degree of freedom which is also illustrated by FIG. 9 and FIG. 10. In the embodiment in FIG. 9, the first and second type of cavities 12, 13 are arranged successively in blocks and in the embodiment in FIG. 10, the first and second type of cavities 12, 13 are arranged alternately.

It is contemplated in an embodiment of the invention, that the first, second and/or type cavities 12, 13, 14 may be arranged in a combination of blocks and alternately.

In a further embodiment of the invention, wherein the first, second and/or third type cavities 12, 13, 14 are arranged alternating on the engraved surface 11, the distance S between the neighboring first and second type cavities 12, 13 may be ≥0.

Referring now to FIG. 11, a similar embodiment in relation to the embodiments in FIG. 9 and FIG. 10 is shown. The engraved surface 11 is provided with a third type cavity 14 that is parallel with the normal vector of the engraved surface 11 of the covering element 10, i.e. the third type cavities 14 have been engraved at a polar angle of 0 degrees.

Figure 12:
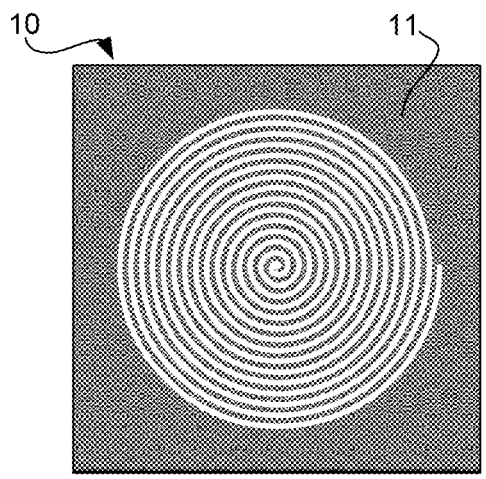
FIG. 12 shows an embodiment of a part of the surface of the covering element, wherein an engraved continuous cavity forms a spiral pattern on the surface.

Referring now to FIG. 12, an embodiment of the engraved surface 11 of the covering element 10 from a top view is shown. The engraved surface 11 has been provided with one continuous cavity that forms spiral.

Generally, the spiral may in an embodiment comprise both first, second and/or third type cavities 12, 13, 14, wherein the distance between each neighboring first, second, and/or third type cavity 12, 13, 14 is ≥0.

Figure 13:
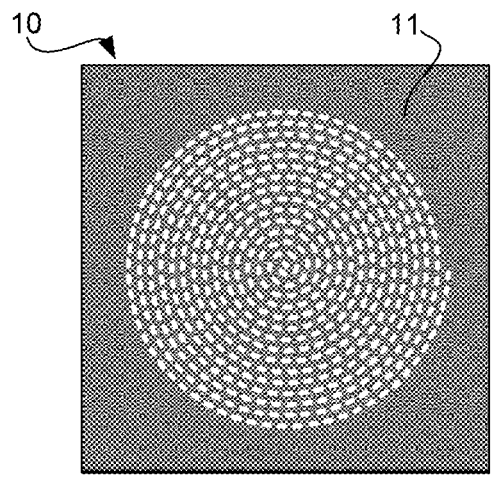
FIG. 13 shows an embodiment of a part of the surface of the covering element, wherein a series of engraved cavities forms a spiral pattern on the surface.

Referring now to FIG. 13, an embodiment similar to the embodiment in FIG. 12 is shown. The spiral in this embodiment is formed by a series of non-connecting cavities. The cavities may comprise both first, second and/or type cavities 12, 13, 14 extending into the surface at different polar and/or azimuth angles. Furthermore, the first, second and/or third type cavities 12, 13, 14 may be arranged in blocks, alternating, or a combination thereof.

Figure 14:
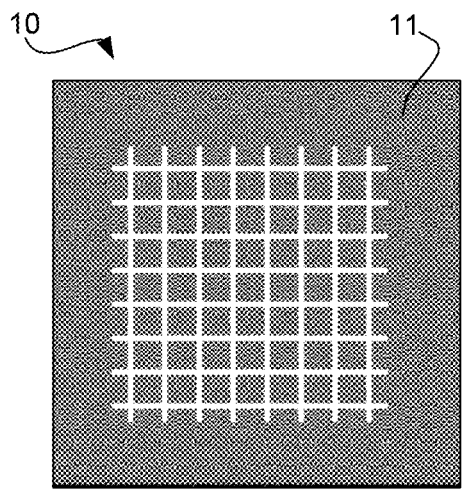
FIG. 14 shows an embodiment of a part of the surface of the covering element, wherein several engraved intersecting cavities form a mesh pattern on the surface.

Referring now to FIG. 14, an embodiment of the engraved surface 11 of the covering element 10 from a top view is shown. The engraved surface 11 is provided as a mesh of continuous cavities. Thereby, an anchor portion of the connection element 20 may be provided on a part of the mesh or may cover the total area of the mesh. Because the engraving process is relatively non-invasive and does not weaken the surface notably, the covering element 10 may be engraved on a larger surface than is covered by the connection element 20. This allows some room for error in the production line.

Generally, the connection element 20 may also cover an area greater than the area provided by the mesh or any pattern according to the invention. The depth of and the surface area covered by the cavities 12, 13, 14 is determined on the required attachment strength and how large an area the connection element 20 covers. In some instances, it may only be needed to engrave an outer periphery of a connection junction between the covering element 10 and connection element 20.

Figure 15:
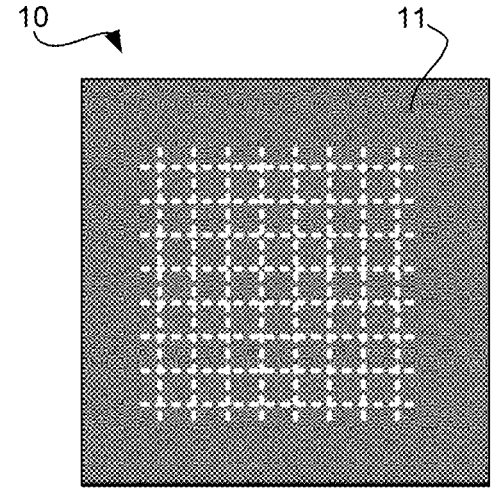
FIG. 15 shows an embodiment similar to the one shown in FIG. 14, wherein the continuous cavities have been replaced with a series of non-connected cavities.

Referring now to FIG. 15 that shows a pattern of a mesh engraved in the surface 11 of the covering element 10 similar as in the embodiment in FIG. 14. The cavities on the engraved surface 11 of the covering element 10 are provided as non-connecting cavities, i.e. there is a distance S between each cavity.

Figure 16:
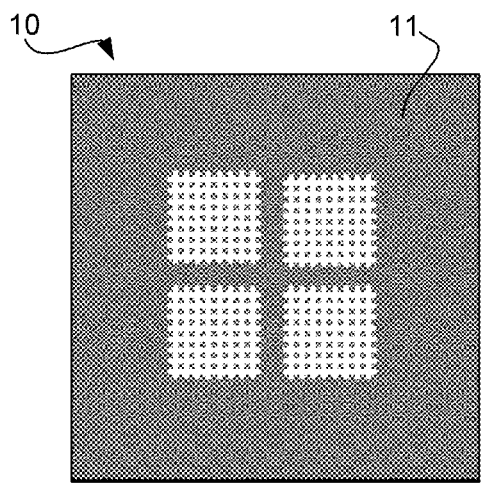
FIG. 16 shows an embodiment of a part of the surface of the covering element, wherein several engraved intersecting cavities forms four mesh patterns on the surface.

Referring now to FIG. 16, a plurality of mesh patterns is shown. The connection element 20 may be attached on the engraved surface 11 so that the connection element 20 is in contact with each mesh. However, this it is not a requirement.

It is contemplated that a plurality of connection elements 20 can be attached to one covering element 10, wherein each connection element may have a separate anchor portion 25 connection element 20 to connect with the covering element 10.

Figure 17:
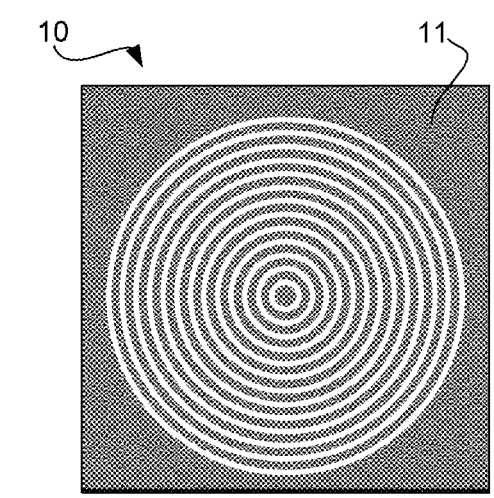
FIG. 17 shows an embodiment of a part of the surface of the covering element, wherein several engraved cavities forms a pattern of concentric circles on the surface.

FIG. 17 shows an embodiment an engraved surface 11 according to the invention. The pattern on the engraved surface 11 is provided by concentric circles that vary in diameter. In the shown embodiment, wherein the engraved circular cavities are viewed from above the direction which the cavities extend into the surface cannot be seen. In a preferred embodiment, each the circular cavities are rotationally symmetric, such that the cavity has been engraved at a constant polar angle and a changing azimuth angle.

Generally, a pattern of concentric circles comprise both first, second and/or third type of 12, 13, and 14.

Figure 18A:
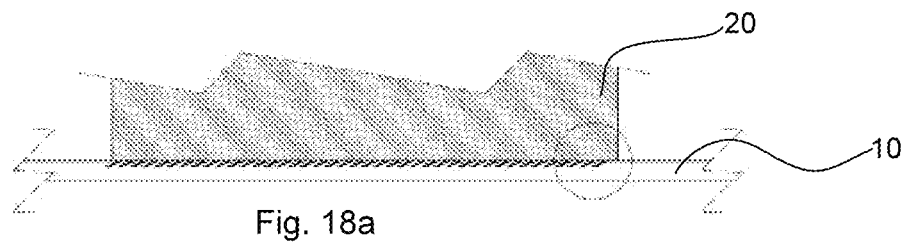
FIG. 18a shows a cross sectional view of a schematic drawing of an embodiment a covering element obtained by the method according to the invention, wherein the anchor portion is a thermoplastic polymer.
Figure 18B:
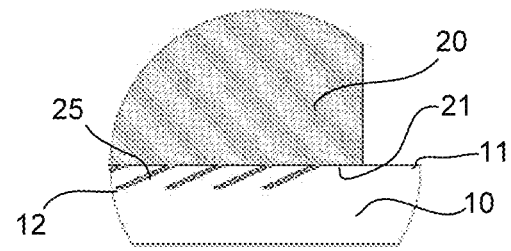
FIG. 18b shows an enlarged cross sectional view of a part of the embodiment 18a, FIG. 19a shows a cross sectional view of a schematic drawing of an embodiment wherein the anchor portion is an adhesive provided between into cavities of the covering element and the connection element.

FIGS. 18*a* and 18*b* shows a schematic drawing of the attachment between a covering element 10 and a connection element 20 obtained by the present invention. The attachment has been obtained by providing an engraved surface 11 of the covering element 10, the engraved surface comprises at least one first type cavity 12.

attaching the connection element 20 to the covering element 10 by introducing an anchor portion 25 of the connection element 20 into the at least one first type cavity to provide an attachment between the covering element 10 and the connection element 20.

wherein the step of engraving the surface 11 of the covering element is performed by subjecting the covering element 10 to a laser beam at a polar angle different from 0 degrees.

The engraved surface 11 is provided with a plurality of first type cavities 12. The connection element 20 is provided with an anchor portion having a surface 21 facing the engraved surface 11. In this embodiment the anchor portion 25 is made from a thermoplastic polymer and is introduced into the engraved surface 11 by heating the covering element 10 and placing the connection element 20 on the engraved surface 11. Subsequently allow the anchor portion 25 to melt and settle in the first type cavities 12 of the engraved surface 11.

Generally, the anchor portion of the connection element may be placed on the engraved surface of the covering element before providing heat to the covering element and/or the connection element.

In another embodiment of the invention the anchor portion 25 of the connection element 20 may be directly heated by heating means such as but not limited to heat, laser welding, or ultrasound.

Figure 19A:
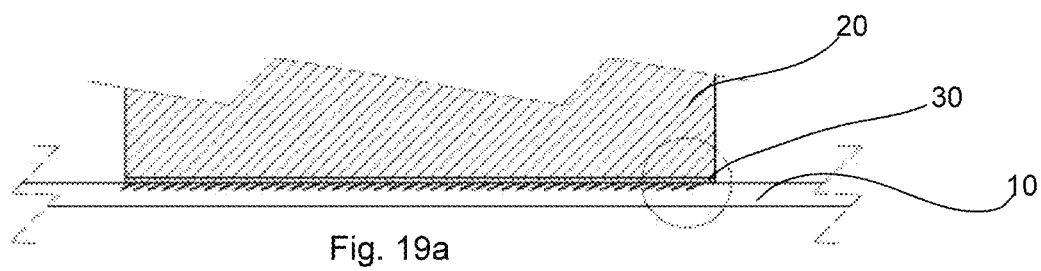
FIG. 19b shows an enlarged cross sectional view of a part of the embodiment 19a, FIG. 20 shows a cross sectional view of an embodiment of the invention, wherein a covering element have been subjected to laser engraving and the anchor portion is an adhesive layer provided between the covering element and connection element.
Figure 19B:
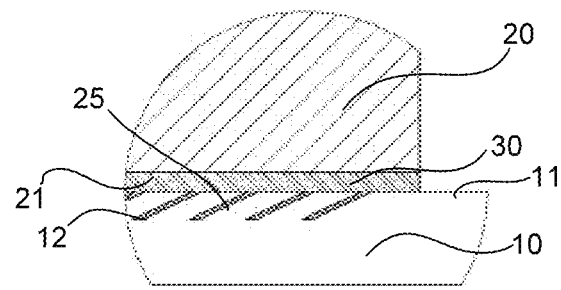

Referring now to FIGS. 19*a* and 19*b*, an embodiment of the invention, wherein the anchor portion 25 is provided as an adhesive layer 30 between the surface 21 of the connection element 20 and the engraved surface 11 of the covering element 10 is shown.

The adhesive layer 30 is UV curable adhesive that is introduced into the first type cavities 12. The adhesive is activated and subsequently the surface 21 of the connection element 20 is pressed against the engraved surface 11 of the covering element 10 until an attachment is formed.

Figure 20:
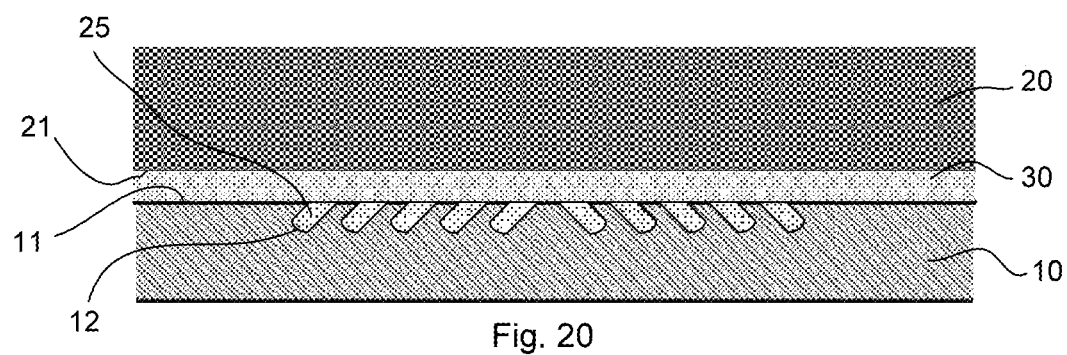

Referring now to FIG. 20, a schematic illustration of an embodiment of the invention, wherein the engraved surface 11 of the covering element 10 is provided with first and second type cavities 12, 13 that are arranged in blocks is shown. The covering element 10 is made from metal and the connection element 20 is made from plastic. Between the connection element 20 is provided with an anchor portion 25 made from an adhesive layer 30.

Figure 21:
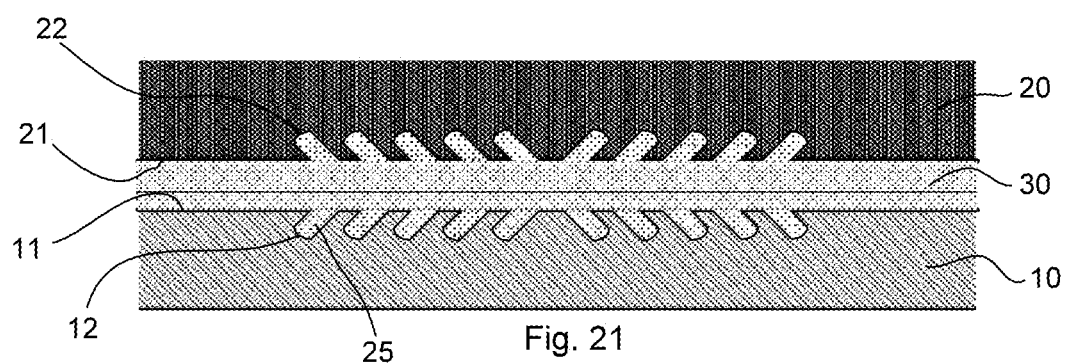
FIG. 21 shows a cross sectional view of an embodiment of the invention, wherein a covering element and a connection element have both been subjected to laser engraving and the anchor portion is an adhesive layer provided between the covering element and connection element.

Referring now to FIG. 21, a schematic illustration of an embodiment of the invention is shown. The embodiment is similar to the embodiment shown in FIG. 20. However, in this particular embodiment, the connection element and the covering element 10 have been subjected to a laser engraving step according to the invention. Furthermore, an anchor portion 25 made of an adhesive layer 30 is provided between the two engraved surfaces 11, 21.

The invention claimed is:

1. A method of providing a covering element with a connection element for covering a hinge part of a roof window comprising the steps of:
    a) engraving an interior surface of the covering element to provide an engraved surface with at least one cavity by subjecting the covering element to a laser beam at a polar angle, α1; and
    b) attaching the connection element to the covering element by introducing an anchor portion into the least one cavity, wherein the anchor portion forms a part of the connection element or is operably connected to the connection element.

2. The method according to claim 1, wherein the at least one cavity is engraved at a polar angle, α1, different from 0 degrees.

3. The method according to claim 1, wherein step a) further comprises engraving the engraved surface with at least one further cavity by subjecting the covering element to a laser beam from a different direction than that used to engrave the at least one cavity, such that the at least one cavity and the at least one further cavity do not extend into the engraved surface in parallel directions.

4. The method according to claim 3, wherein the at least one cavity and the at least one further cavity are engraved at the same polar angle, α1, but at different azimuth angles.

5. The method according to claim 1, wherein the at least one cavity forms a pattern in the interior surface of the covering element, the pattern being one of a mesh, a grid, a circle and a spiral.

6. The method according to claim 1 wherein the covering element is made from plastic or metal.

7. The method according to claim 1, wherein the laser engraving is performed by at least two lasers, wherein the at least two lasers provide a laser beam from different polar and/or azimuth angles on the engraved surface of the covering element.

8. The method according to claim 1, wherein the anchor portion is a thermoplastic polymer, and the step of introducing the anchor portion into the engraved surface in step b is performed by melting the anchor portion and allowing the melted anchor portion to settle into the at least one cavity of the engraved surface, wherein the anchor portion forms a part of the connection element.

9. The method according to claim 8, wherein the melting of the anchor portion is accomplished by laser, heat, or ultra-sound.

10. The method according to claim 1, wherein the connection element is molded directly on the engraved surface, whereby the anchor portion is introduced into and formed in the engraved surface.

11. The method according to claim 10, wherein the molding of the connection element to the covering element is performed by injection molding.

12. The method according to claim 1, wherein the anchor portion is an adhesive provided in a layer between the engraved surface of the covering element and the connection element.

13. The method according to claim 12, wherein the engraved surface of the covering element facing the adhesive layer is subjected to step a.

14. The method according to claim 12, wherein the adhesive is a light-curable adhesive.

15. The method according to claim 12, wherein the adhesive is a UV-curable adhesive.

16. The method according to claim 1, wherein the method comprises an additional step of pressing the covering element and the connection element against each other during and/or subsequently after step b).

17. The method according to claim 1, wherein step a) further comprises engraving the engraved surface with at least one further cavity and the at least one cavity and/or the at least one further cavity form a pattern in the interior surface of the covering element, the pattern being one of a mesh, a grid, a circle and a spiral.

18. The method according to claim 1, wherein step a) further comprises engraving the engraved surface with at least one further cavity and the at least one cavity and the at least one further cavity form a pattern in the interior surface of the covering element, the pattern being one of a mesh, a grid, a circle and a spiral.

19. The method according to claim 1, wherein the method comprises an additional step of pressing the covering element and the connection element against each other during and subsequently after step b).

20. The method according to claim 1, wherein the method comprises an additional step of pressing the covering element and the connection element against each other during step b).

* * * * *